US009889813B2

(12) United States Patent
Evans

(10) Patent No.: US 9,889,813 B2
(45) Date of Patent: Feb. 13, 2018

(54) APPARATUS FOR PRESSURE BONDING OF A COVERING ON AN AUTOMOTIVE INTERIOR COMPONENT AND A METHOD FOR PRESSURE BONDING THEREOF

(71) Applicant: INOAC USA, INC., Troy, MI (US)

(72) Inventor: Gregg S. Evans, Stratford (CA)

(73) Assignee: Inoac USA, Inc., Troy, MI (US)

( * ) Notice: Subject to any disclaimer, the term of this patent is extended or adjusted under 35 U.S.C. 154(b) by 146 days.

(21) Appl. No.: 14/693,409

(22) Filed: Apr. 22, 2015

(65) Prior Publication Data
US 2015/0224954 A1    Aug. 13, 2015

Related U.S. Application Data

(60) Provisional application No. 61/983,195, filed on Apr. 23, 2014.

(51) Int. Cl.
*B60R 21/215* (2011.01)
*B32B 37/00* (2006.01)
(Continued)

(52) U.S. Cl.
CPC .......... *B60R 21/215* (2013.01); *B23K 20/106* (2013.01); *B23K 20/233* (2013.01);
(Continued)

(58) Field of Classification Search
CPC ............. B29C 66/8266; B29C 66/1122; B29C 66/532; B29C 66/723; B29C 66/8322;
(Continued)

(56) References Cited

U.S. PATENT DOCUMENTS 3,814,653 A * 6/1974 Heier .................. B32B 3/12
156/285
4,087,037 A * 5/1978 Schier .................. B21D 26/055
219/85.17
(Continued)

FOREIGN PATENT DOCUMENTS

DE    10 2009 005 313 A1    9/2010
EP     2 636 497 A1    9/2013
(Continued)

OTHER PUBLICATIONS

International Search Report and Written Opinion dated Jul. 24, 2015 in International App. No. PCT/US2015/027326.

*Primary Examiner* — Alison L Hindenlang
*Assistant Examiner* — Jerzi H Moreno Hernandez
(74) *Attorney, Agent, or Firm* — Dykema Gossett PLLC

(57) ABSTRACT

An apparatus for manufacturing an automotive interior component and a method for manufacture thereof are provided. The method includes providing a first and second layer of the automotive interior component. The method includes providing an apparatus comprising a first press component and a second press component, the first press component including a pressure chamber configured to receive a protrusion of the first layer. The method includes inserting the first layer into the first press component, such that the protrusion is received by the pressure chamber of the first press component. The method includes coupling the first layer and the second layer, wherein coupling comprises moving at least one of the first press component and second press component toward the other and introducing a first fluid into the pressure chamber of the first press component such that the fluid applies a fluid pressure to the first layer.

10 Claims, 8 Drawing Sheets

(51) Int. Cl.
  *B32B 37/02* (2006.01)
  *B32B 37/06* (2006.01)
  *B32B 37/18* (2006.01)
  *B60R 21/2165* (2011.01)
  *B23K 20/10* (2006.01)
  *B23K 20/233* (2006.01)
  *B29C 65/48* (2006.01)
  *B29C 65/00* (2006.01)
  *B29C 65/02* (2006.01)
  *B29L 31/30* (2006.01)
  *B23K 103/00* (2006.01)

(52) U.S. Cl.
  CPC .............. *B29C 65/02* (2013.01); *B29C 65/48* (2013.01); *B29C 66/1122* (2013.01); *B29C 66/532* (2013.01); *B29C 66/723* (2013.01); *B29C 66/8266* (2013.01); *B29C 66/8322* (2013.01); *B60R 21/2165* (2013.01); *B23K 2203/34* (2015.10); *B29C 65/4825* (2013.01); *B29C 66/71* (2013.01); *B29C 66/727* (2013.01); *B29L 2031/3038* (2013.01)

(58) Field of Classification Search
  CPC ....... B29C 66/71; B29C 66/727; B29C 65/48; B29C 65/02; B29C 65/4825; B60R 21/215; B60R 21/2165; B29L 2031/3038; B23K 20/106; B23K 20/233; B23K 2203/34
  See application file for complete search history.

(56) References Cited

U.S. PATENT DOCUMENTS

| | | | |
|---|---|---|---|
| 4,559,797 A * | 12/1985 | Raymond | ............ B21D 26/055 |
| | | | 72/342.8 |
| 4,836,765 A | 6/1989 | Kornitzky et al. | |
| 6,056,531 A | 5/2000 | Furuya et al. | |
| 6,131,945 A | 10/2000 | Labrie et al. | |
| 6,386,856 B1 | 5/2002 | Chem et al. | |
| 6,595,543 B2 | 7/2003 | Desprez | |
| 8,236,217 B2 | 8/2012 | Evans | |
| 2003/0012839 A1 | 1/2003 | Evans et al. | |
| 2005/0040569 A1 | 2/2005 | Fitzell | |
| 2005/0140059 A1 | 6/2005 | Ernst et al. | |
| 2008/0211208 A1 | 9/2008 | Evans | |
| 2009/0205777 A1* | 8/2009 | McLaughlin | ....... B32B 37/1027 |
| | | | 156/285 |
| 2009/0211694 A1* | 8/2009 | Hisai | .................. B29C 65/0618 |
| | | | 156/73.5 |
| 2011/0120639 A1* | 5/2011 | Laker | .................. B29C 35/0805 |
| | | | 156/282 |
| 2013/0001931 A1 | 1/2013 | Evans | |
| 2013/0093297 A1* | 4/2013 | Guan | ..................... B29C 63/02 |
| | | | 312/204 |
| 2013/0306244 A1 | 11/2013 | Evans | |
| 2015/0151705 A1* | 6/2015 | Sugawara | ............. B60R 21/215 |
| | | | 280/728.3 |

FOREIGN PATENT DOCUMENTS

| | | | | |
|---|---|---|---|---|
| JP | 2007091024 A | * | 4/2007 | ........... B29C 66/112 |
| JP | 2007160886 A | * | 6/2007 | ........... B29C 66/112 |
| JP | 2011126178 A | * | 6/2011 | |

* cited by examiner

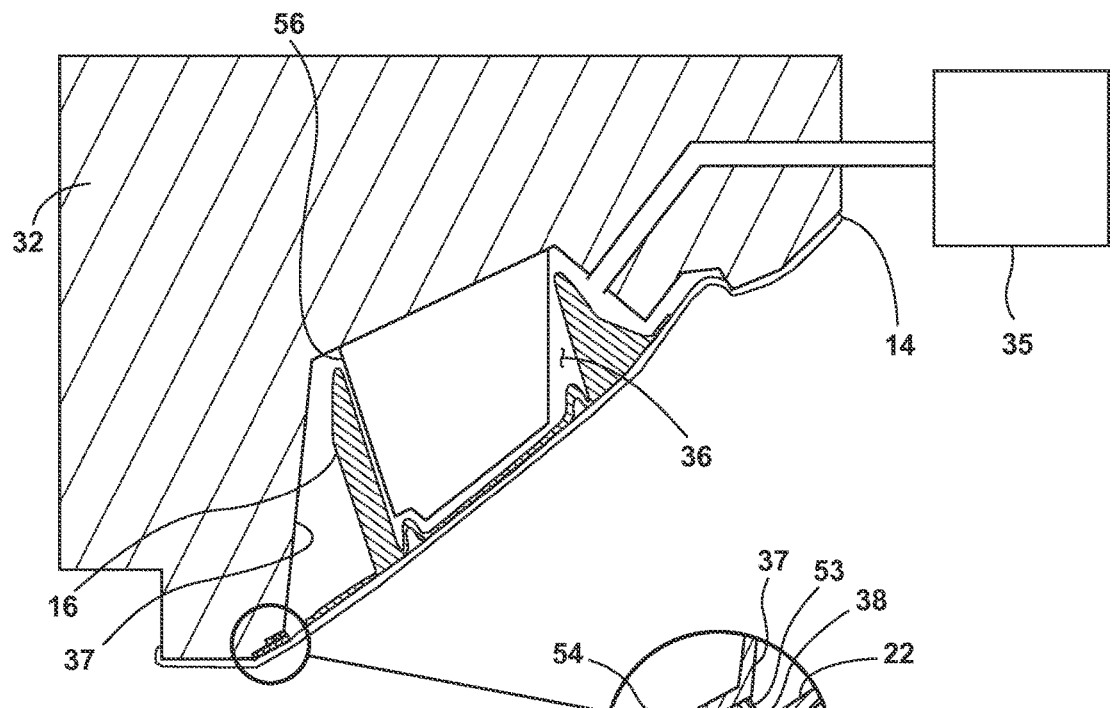
FIG. 3A
FIG. 3D
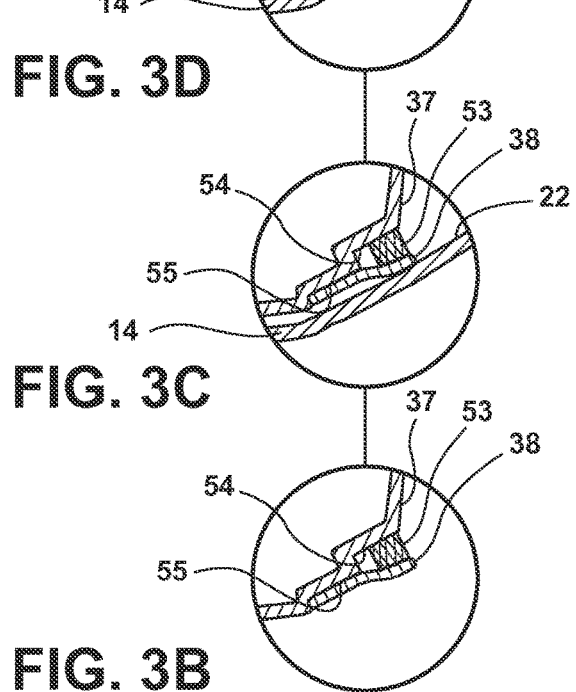
FIG. 3C
FIG. 3B

APPARATUS FOR PRESSURE BONDING OF A COVERING ON AN AUTOMOTIVE INTERIOR COMPONENT AND A METHOD FOR PRESSURE BONDING THEREOF

CROSS-REFERENCE TO RELATED APPLICATIONS

This application claims the benefit of U.S. provisional application Ser. No. 61/983,195, filed Apr. 23, 2014 ("the '195 application"). The '195 application is hereby incorporated by reference as though fully set forth herein. This application also incorporates by reference U.S. patent application Ser. No. 13/953,479 ("the '479 application") filed Jul. 29, 2013 entitled "PRESTRESSING FIXTURE TO ELIMINATE AUTOMOTIVE P.S.I.R. DOOR-CHUTE VIBRATION WELD VISIBILITY," U.S. patent application Ser. No. 13/569,004 ("the '004 application") filed Aug. 7, 2012 entitled "PRESTRESSING FIXTURE TO ELIMINATE AUTOMOTIVE P.S.I.R. DOOR-CHUTE VIBRATION WELD VISIBILITY," U.S. patent application Ser. No. 12/946,432 ("the '432 application") filed Nov. 15, 2010 entitled "PRESTRESSING FIXTURE TO ELIMINATE AUTOMOTIVE P.S.I.R. DOOR-CHUTE VIBRATION WELD VISIBILITY," U.S. patent application Ser. No. 11/952,503 (the '503 application") filed Dec. 7, 2007 entitled "PRESTRESSING FIXTURE TO ELIMINATE AUTOMOTIVE P.S.I.R. DOOR-CHUTE VIBRATION WELD VISIBILITY," and U.S. provisional patent application Ser. No. 60/873,274 ("the '274 application") filed Dec. 7, 2006 entitled "PRESTRESSING FIXTURE TO ELIMINATE AUTOMOTIVE P.S.I.R. DOOR-CHUTE VIBRATION WELD VISIBILITY,". The '479 application, the '004 application, the '432 application, the '503 application, and the '274 application are all also hereby incorporated by reference herein in their entireties.

BACKGROUND a. Technical Field

The disclosure relates generally to automotive interior components, an apparatus for and method of manufacture thereof, and, more particularly, to an apparatus for and method of pressure bonding of a covering on an automotive interior component, which allows for press bonding of materials with complex shapes and angles.

b. Background Art

This background description is set forth below for the purpose of providing context only. Therefore, any aspects of this background description, to the extent that it does not otherwise qualify as prior art, is neither expressly nor impliedly admitted as prior art against the instant disclosure.

Automobiles are commonly equipped with airbags for reducing driver and passenger injuries in the case of an accident. Automobile airbags are generally located in areas where a driver or passenger would potentially contact an automobile interior in the event of an accident. Airbags can reduce injuries by providing a substantially non-solid surface for the driver or passenger to contact, as opposed to the generally solid surfaces of the automotive interior. Although the functionality of the airbag is greatly valued, the visual appeal of the instrument panel, and invisibility of the airbag system are also of value to automobile manufacturers and consumers alike.

In order to install an airbag, the airbag is generally folded into a module that is installed into or behind an automotive interior component. The module housing a passenger-side airbag is generally installed on the underside of a hard substrate (molded to form the component, e.g., instrument panel), within a PSIR chute protruding behind the substrate. The substrate will generally have a pre-weakened area, allowing an airbag to release therethrough. A PSIR chute will be bonded to the substrate, and will generally include doors that line up with the pre-weakened area of the instrument panel. A known method for attaching a PSIR chute to an instrument panel (i.e., substrate) includes vibration welding the PSIR chute to the instrument panel, which is discussed in greater detail in the '479 application.

The aforementioned automotive interior components may include a hard substrate, an outer skin (e.g., TPO, Urethane, or PVC), and a polypropylene, polyethylene or polyurethane foam layer sandwiched therebetween. The outer skin is generally attached to the hard substrate to give the texture and appearance desired by the customers, and the foam layer provides or enhances the softness of the component. Premium touch skin materials (e.g., soft-touch, fabric-backed, leather-like materials) may be added through corner sewing, edge wrap, trimming, or combinations thereof.

It may be desirable to install an aesthetically-pleasing covering over the instrument panel, such as a "bilaminate" covering with a foam layer and a soft, leather-like layer. Use of a bilaminate covering can limit the choice of mechanisms to attach the PSIR chute to the instrument panel (and vice versa). For example, if the PSIR chute is attached to the instrument panel first using the method disclosed in the '479 application, which results in an undistorted base to support the bilaminate covering, then it may be difficult to press-bond the bilaminate covering onto the instrument panel due to the complex geometries of the PSIR chute. However, if the bilaminate covering is bonded to the instrument panel (i.e., substrate) first, then the options may be limited as to how to attach the PSIR chute to the instrument panel without visual distortion to the instrument panel and, thus, the bilaminate covering it supports.

The foregoing discussion is intended only to illustrate the present field and should not be taken as a disavowal of claim scope.

SUMMARY

Among other things, various embodiments disclosed herein are directed to an apparatus for manufacturing an automotive interior component and a method for manufacture thereof. In particular, the instant disclosure relates to an apparatus for pressure bonding of a covering on an automotive interior component and a method for press bonding thereof.

A method for manufacturing an automotive interior component in accordance with an embodiment of the present teachings includes providing a first layer of the automotive interior component, the first layer including a first surface, a second surface opposed of the first surface, and a protrusion protruding from the second surface away from the first surface. The method further includes providing a second layer of the automotive interior component, the second layer comprising a first surface and a second surface opposed of the first surface configured to contact the first surface of the first layer. The method further includes providing an apparatus comprising a first press component and a second press component, wherein the first press component comprises a pressure chamber configured to receive the protrusion of the first layer. The method further includes inserting the first layer into the first press component, such that the protrusion is received by the pressure chamber of the first press component. The method further includes coupling the first layer and the second layer of the automotive interior component. Coupling the first and the second layers includes moving at least one of the first press component and second press component toward the other of the first press component and second press component such that the first surface of the first layer and the second surface of the second layer are pressed together. Coupling the first and second layers further includes introducing a first fluid into the pressure chamber of the first press component such that the fluid applies a fluid pressure to the second surface of the first layer.

An apparatus for manufacturing an automotive interior component in accordance with an embodiment of the present teachings includes a first press component with a pressure chamber configured to receive a protrusion of the automotive interior component. The apparatus further includes a second press component configured to come in close proximity of the first press component. A first fluid is introduced into the pressure chamber of the first press component and applies a fluid pressure to at least one of a first layer and a second layer of the automotive interior component.

The foregoing and other aspects, features, details, utilities, and advantages of the present disclosure will be apparent from reading the following description and claims, and from reviewing the accompanying drawings.

BRIEF DESCRIPTION OF THE DRAWINGS

FIG. 3A is a schematic cross-sectional view of an upper press component of the apparatus of FIG. 1.

FIGS. 3B-3D are schematic, cross-sectional, enlarged views illustrating operation of a gasket of the upper press component as the substrate is loaded in the apparatus of FIG. 1.

DETAILED DESCRIPTION

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Figure 1:
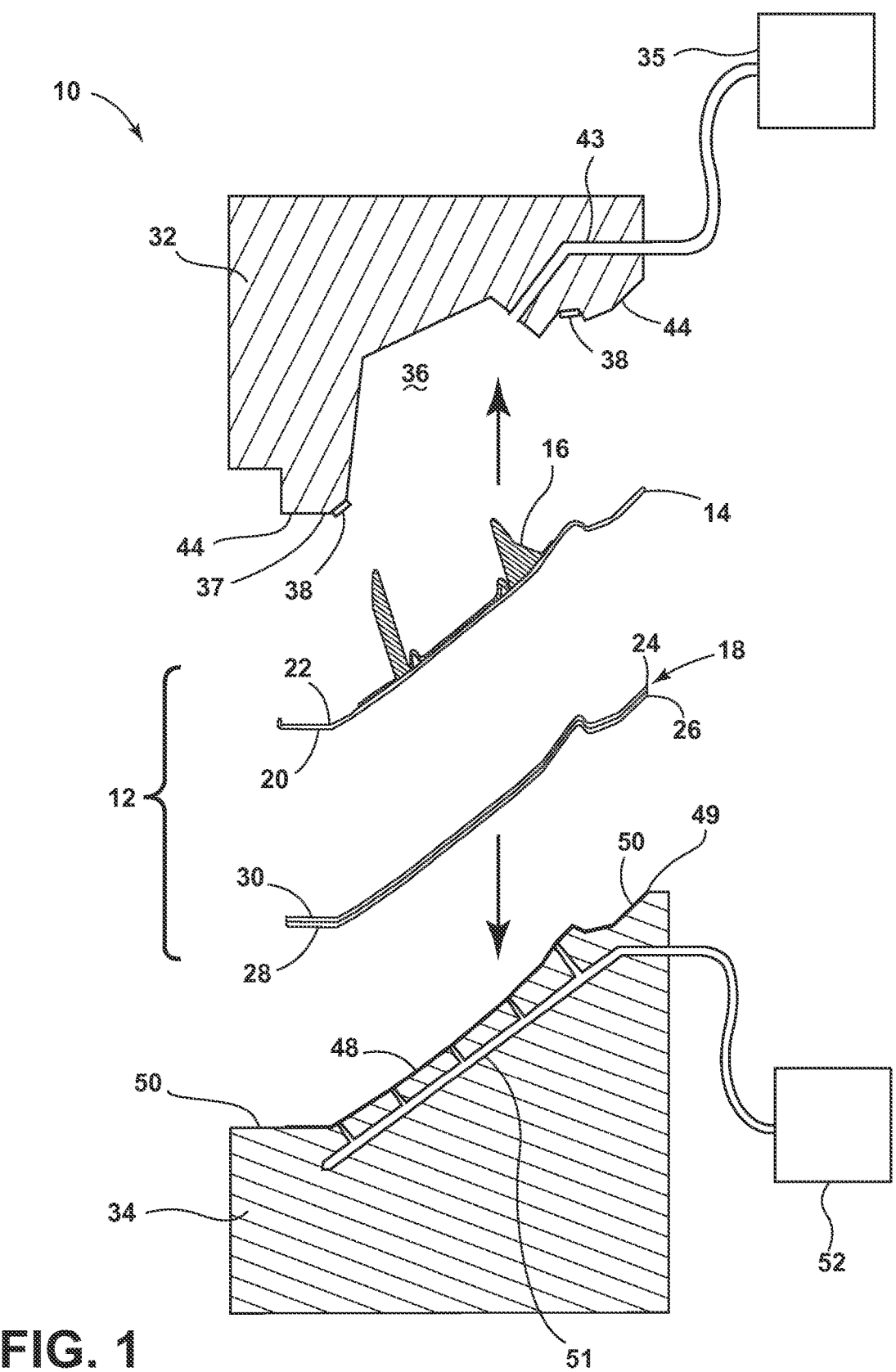
FIG. 1 is a schematic cross-sectional view of an apparatus in an open position configured for use in connection with a method of manufacturing an automotive interior component in accordance with an embodiment of the present teachings.

Referring now to the drawings wherein like reference numerals are used to identify identical or similar components in the various views, FIG. 1 is a schematic cross-sectional view of an apparatus 10 in an open position configured for use in connection with a method of manufacturing an automotive interior component 12 in accordance with an embodiment of the present teachings. Automotive interior component 12 will first be described followed by a description of the components and operation of apparatus 10.

Automotive interior component 12 may include a substrate 14 with a protrusion 16; automotive interior component 12 may also include a covering 18. Substrate 14 may include a front surface 20 and a back surface 22 opposed of front surface 20 with protrusion 16 protruding from back surface 22 away from front surface 20. Protrusion 16 of substrate 14 may be an inflatable restraint chute (i.e., air bag chute); as such, protrusion 16 may be configured to house a module containing an inflatable restraint (not shown). Upon deployment, the inflatable restraint housed within protrusion 16 breaks through substrate 14 and through covering 18. In an embodiment, protrusion 16 may be made from a very tough (i.e., strong) but soft plastic to handle the violence of inflatable restraint deployment. In some embodiments, protrusion 16 may be attached to substrate 14 prior to operation of apparatus 10 (which will be described in more detail below).

Substrate 14 may have a thickness of about 3.5 millimeters in accordance with an embodiment. Although a particular thickness is mentioned in detail, the thickness of substrate 14 may be greater or less than 3.5 millimeters in accordance with other embodiments. Substrate 14 may comprise a polymer in accordance with some embodiments. Although substrate 14 is described as comprising a polymer in some embodiments, the substrate 14 may comprise any number of materials in accordance with various other embodiments. For example only and without limitation, substrate 14 may comprise polycarbonate/acrylonitrile butadiene styrene (PCABS), polypropylene fumarate) (PPF), shape-memory alloy (SMA), and/or thermoplastic polyolefin (TPO).

Still referring to FIG. 1, covering 18 may include two layers: a foam layer 24 configured to be bonded to front surface 20 of substrate 14 and an outer layer 26 (covering 18 illustrated in FIG. 1 is not drawn to scale). Foam layer 24 may consist of a high-density skin and a low-density core. Foam layer 24 may also generally be referred to as an integral-skin foam layer and may be referred to as having a cellular interior and a microcellular or noncellular skin. Foam layer 24 may comprise urethane in an embodiment. Outer layer 26 may comprise a premium-touch and/or soft-touch material in accordance with an embodiment. For example only and without limitation, outer layer 26 may comprise premium artificial and/or imitation leather in an embodiment. In accordance with other embodiments, outer layer 26 may also include a fabric backing (not shown) to improve the strength of outer layer 26, as outer layer 26 may be relatively thin and soft. In the illustrated embodiment, covering 18 includes a front surface 28 corresponding to a surface of outer layer 26 and a back surface 30 opposed of front surface 28 corresponding to a surface of foam layer 24. A description of the components and operation of apparatus 10 now follows.

Still referring to FIG. 1, apparatus 10 may include an upper press component 32, a lower press component 34, and fluid supply sources 35, 52. Upper press component 32 may include a contoured surface 37 generally facing lower press component 34, a pressure chamber 36 that is defined by surface 37 and by a gasket 38 disposed on surface 37, and a passageway 43 extending from fluid supply source 35 to pressure chamber 36, passageway 43 being configured to direct a fluid (i.e., liquid or gas) supplied from source 35 to chamber 36. Contoured surface 37 of upper press component 32 may include a pressing surface 44 external to gasket 38 for conventional press bonding with the physical pressure exerted by upper press component 32 on lower press component 34 (and/or vice versa). Pressure chamber 36 may be configured to receive protrusion 16. The shape and area of pressure chamber 36 may be defined by surface 37 and by gasket 38, as gasket 38 (upon sealing) may be configured to contain the fluid (not shown) introduced by fluid supply source 35 within pressure chamber 36. Although in the illustrated embodiment, upper press component 32 is configured to receive substrate 14, one of ordinary skill in the art will understand that lower press component 34 may instead be configured to receive substrate 14.

Gasket 38 is configured to contain the fluid (not shown) within pressure chamber 36 of upper press component 32. Gasket 38 may be disposed on contoured surface 37 of upper press component 32 and may generally extend around the perimeter of protrusion 16 of substrate 14 once loaded. In one embodiment, gasket 38 follows the perimeter of protrusion 16, approximately 10 mm outboard therefrom. Gasket 38 may be made of rubber or other like materials. In one embodiment, gasket 38 may be a silicone gasket bead. In another embodiment, gasket 38 may comprise a strip of rubberized canvas (similar to that used in airplane hatches). In such an embodiment, pressure can be introduced within or behind gasket 38 to seal chamber 36. Moreover, such an embodiment (strip of rubberized canvas) may be desirable where back surface 22 of substrate 14 is relatively smooth. One of ordinary skill in the art will understand that there are several types of gaskets that can be utilized on apparatus 10 to effectively seal chamber 36.

Still referring to FIG. 1, lower press component 34 comprises a reaction surface 48, a seal 49, a pressing surface 50 generally disposed externally of surface 48 and of gasket 38 (once loaded), and passageways 51. In an embodiment, reaction surface 48 and pressing surface 50 may be shaped similarly to front surface 28 of covering 18. Reaction surface 48 is configured to contact a portion of front surface 28 of covering 18 that is disposed internally of gasket 38 (once loaded). Pressing surface 50 is configured to contact a portion of front surface 28 of covering 18 that is disposed externally of gasket 38 (once loaded). In the illustrated embodiment, passageways 51 extend from a fluid supply source 52 to reaction surface 48, passageways 51 being configured to direct a fluid (i.e., liquid or gas) supplied from source 52 to reaction surface 48 (via holes at reaction surface 48). Seal 49 is configured to contain a fluid supplied by source 52 and may generally extend along the perimeter of front surface 28 of covering 18 (once loaded).

Still referring to FIG. 1, fluid supply sources 35, 52 may be configured to supply fluid to other areas of apparatus 10 (e.g., to gasket 38 to aid in sealing). In some embodiments, fluid supply sources 35, 52 may include pressure regulators and sensors. In one embodiment, fluid supply sources 35, 52 supply atmospheric air. In other embodiments, compressed air, Nitrogen gas, or a liquid may be used. Although separate fluid sources 35, 52 are illustrated as supplying fluid to upper press component 32 and lower press component 34, respectively, one of ordinary skill in the art will understand that only one fluid supply source (or more than two) may be used.

Figure 2:
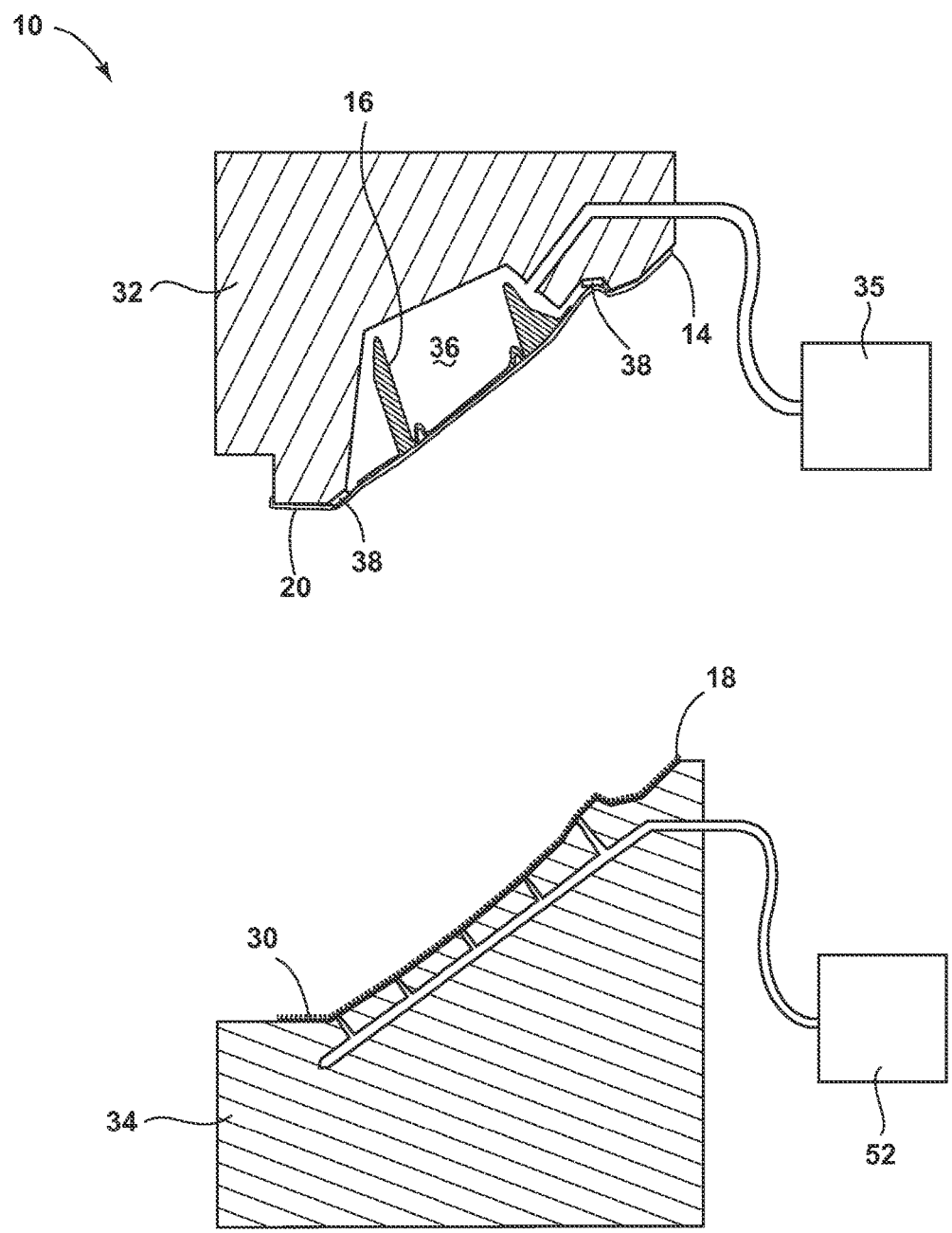
FIG. 2 is a schematic cross-sectional view of the apparatus of FIG. 1 with a substrate and covering of the automotive interior component loaded into the apparatus.

Operation of apparatus 10 will now be described. FIG. 2 is a schematic cross-sectional view of apparatus 10 of FIG. 1 with substrate 14 and covering 18 loaded into the apparatus 10 (for simplicity, covering 18 is illustrated as one thin layer in FIGS. 2-5). In one embodiment, substrate 14 may be manually positioned into upper press component 32 such that protrusion 16 is received by chamber 36 of upper press component 32, with gasket 38 extending around the perimeter of protrusion 16. Before or after loading, an adhesive or bonding agent, such as glue, may be applied to at least one of substrate 14 and/or covering 18. The adhesive may be applied to front surface 20 of substrate 14 and/or back surface 30 of covering 18 (which, in the illustrated embodiment, corresponds to foam layer 24, as shown in FIG. 1).

FIG. 3A is a schematic cross-sectional view of upper press component 32 of the apparatus 10 of FIG. 1. FIGS. 3B-3D are schematic, cross-sectional, enlarged views illustrating operation of gasket 38 as the substrate 14 is loaded in the apparatus 10 of FIG. 1. As illustrated in FIGS. 3B-3D, upper press component 32 may further include a foam member 53 disposed in a recess 54 of surface 37. Recess 54 may extend along the perimeter of protrusion 16. A portion of gasket 38 may be disposed in a recess 55 of surface 37. Recess 55 may extend along the perimeter of protrusion 16 as well. Another portion of gasket 38 may be disposed over foam member 53. As shown in FIG. 3B, prior to loading of substrate 14, foam member 53 may cause a portion of gasket 38 to protrude slightly outwardly (relative to the other portion of gasket 38 disposed in recess 55). FIG. 3C illustrates the moment substrate 14 contacts gasket 38. The slightly protruding gasket 38 aids in ensuring an instant seal as substrate 14 is loaded into upper press component 32. FIG. 3D illustrates substrate 14 fully loaded into upper press component 32. Once fully loaded, foam member 53 compresses (due to, at least in part, the mechanical pressure between upper press component 32 and lower press component 34) such that gasket 38 no longer protrudes outwardly (i.e., it lies flush with back surface 22 of substrate 14). After being loaded, clamps (not shown) may be used to physically retain substrate 14 into upper press component 32.

As illustrated in FIG. 3A, upper press component 32 may also include a ballast volume 56 which extends from surface 37 and into chamber 36 within protrusion 16 of substrate 14 (once loaded). Ballast volume 56 may be used to reduce the amount of fluid needed to be introduced into chamber 36.

Figure 4:
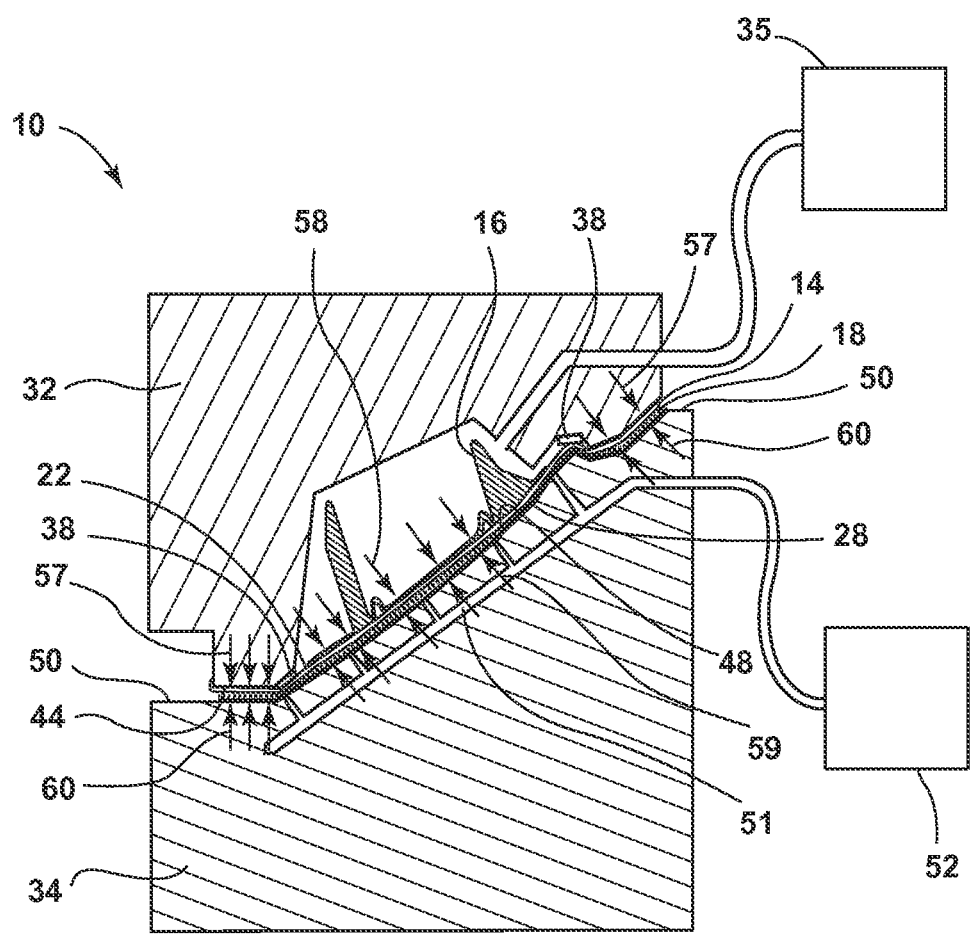
FIG. 4 is a schematic cross-sectional view of the apparatus of FIG. 1 in a closed position.

FIG. 4 is a schematic cross-sectional view of the apparatus 10 of FIG. 1 in a closed position. As illustrated, upper and lower press components 32, 34 may generally come into close proximity of one other to at least partially surround substrate 14 with protrusion 16 and covering 18 and to press the various components (e.g., substrate 14 and covering 18) together. In an embodiment, upper press component 32 moves toward lower press component 34 while lower component 32 remains stationary. One of ordinary skill in the art will understand, however, that lower press component 34 may move while upper press component 32 remains stationary or both upper and lower press components 32, 34 may move toward each other. Protrusion 16 may have complex geometries, however, such that physical contact of upper press component 32 with back surface 22 of substrate 14 is prevented in undercut/covered zones, thereby preventing even pressure on interior component 12 to activate the glue.

Still referring to FIG. 4, through movement of at least one of upper and lower press components 32, 34, pressing surface 44 of upper press component 34 may be configured to apply a surface pressure 57 to back surface 22 of substrate 14 external of gasket 38. In an embodiment, surface pressure 57 may be twenty-five psi. Fluid introduced and pressurized by fluid supply source 35 may apply a fluid pressure 58 to back surface 22 of substrate 14. As upper press component 32 and lower press component 34 come together and as fluid pressure 58 is applied, gasket 38 seals pressure chamber 36 and prevents any fluid from escaping pressure chamber 36 and traveling between pressing surfaces 44, 50 of upper and lower press components, 32, 34, respectively. Fluid pressure 58 is relatively uniform across the portion of back surface 22 of substrate 14 disposed internally of gasket 38.

Although back surface 22 of substrate 14 may have complex geometries due to protrusion 16, the fluid can apply fluid pressure 58 to back surface 22 of substrate 14 inside and outside of protrusion 16 (within pressure chamber 36) without damaging protrusion 16 or substrate 14. This fluid pressure 58 effectively presses substrate 14 into covering 18 such that they become bonded together by, for example, glue. In an embodiment, fluid pressure 58 is equal to approximately 20-25 psi. In some embodiments, it may be desirable to increase the fluid pressure to remove any air bubbles formed between substrate 14 and covering 18 disposed over pressure chamber 36. During operation, the fluid pressure may be held constant or vary throughout.

Using fluid to apply pressure to back surface 22 of substrate 14 disposed over pressure chamber 36 (rather than a conventional press with a pressing surface) ensures that the undercut areas of protrusion 16 and areas under the hinges of protrusion (e.g., chute) 16 are also effectively pressed into covering 18. If conventional pressing methods were used in the area of protrusion 16, then the score lines disposed over the inflatable restraint may become visible, and the zone where contact between protrusion (e.g., chute) 16 and substrate 14 occurs may be visibly bulging. Using fluid pressure allows for any complex geometries on surface 22, while providing equal and controlled bonding pressures across substrate 14 and covering 18. As pressures 57, 58 are applied to substrate 14, reaction pressures 59, 60 may be applied to covering 18 via lower press component 34.

Still referring to FIG. 4, reaction pressures 59, 60 aid in pressing substrate 14 and covering 18 together. Pressing surface 50 of lower press component 34 may be configured to apply reaction pressure 60 to a portion of front surface 28 of covering 18 disposed externally of gasket 38 (once loaded). Reaction surface 48 of lower press component 34 may be configured to apply reaction pressure 59 to a portion of the front surface 28 of covering 18 disposed internally of gasket 38 (once loaded). In one embodiment, reaction pressure 59 can also be applied to front surface 28 of covering 18 via fluid traveling from fluid supply source 52 through passageways 51 to surface 28 of covering 18. In this way, reaction pressure 60 may be (all or in part) a fluid pressure. In some embodiments, reaction pressure applied by fluid onto front surface 28 of covering 18 may be less than fluid pressure 58 applied onto back surface 22 of substrate 14. In one embodiment, the portion of the reaction pressure 60 applied by the fluid from fluid source 52 may be twenty psi. Reaction pressure 60 may be relatively uniform across the affected area of front surface 28 of covering 18.

Figure 5:
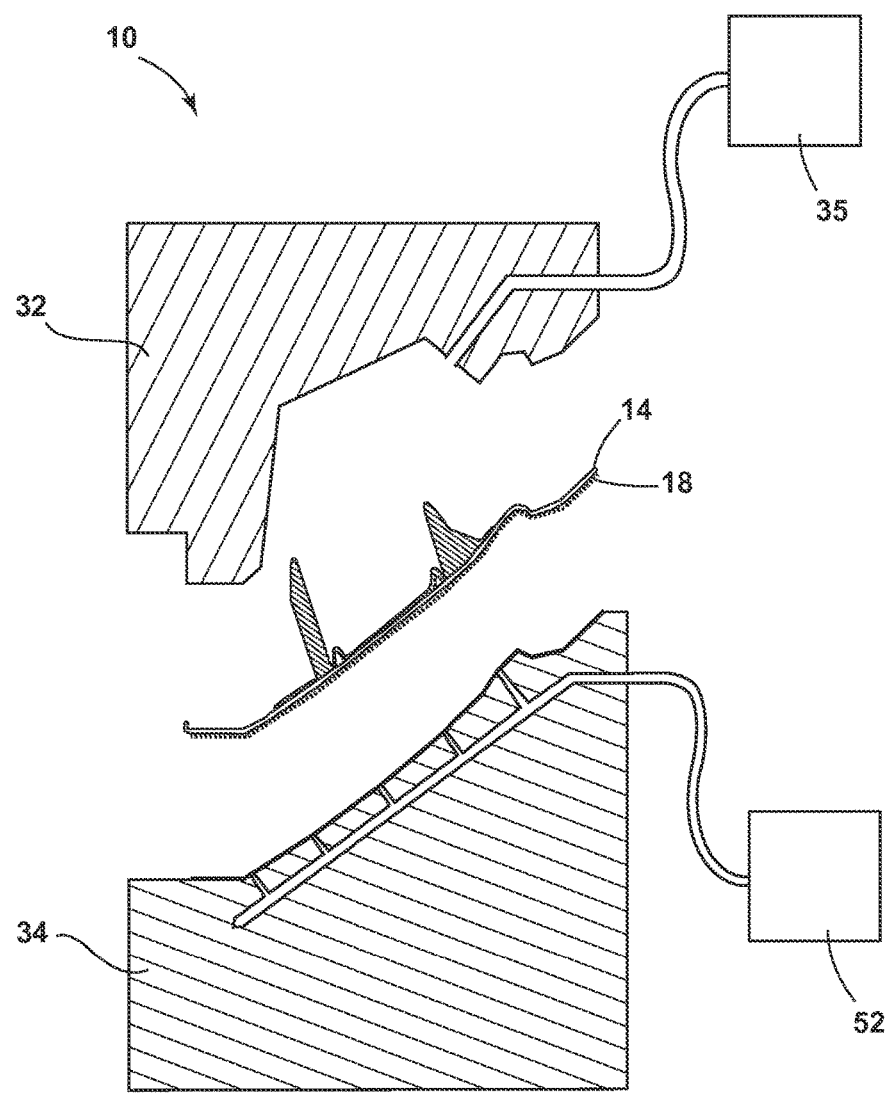
FIG. 5 is a schematic cross-sectional view of the apparatus of FIG. 1 in the open position after the substrate and covering have been bonded together.

FIG. 5 is a schematic cross-sectional view of the apparatus 10 of FIG. 1 in the open position after the substrate 14 and covering 18 have been bonded together.

Figure 6:
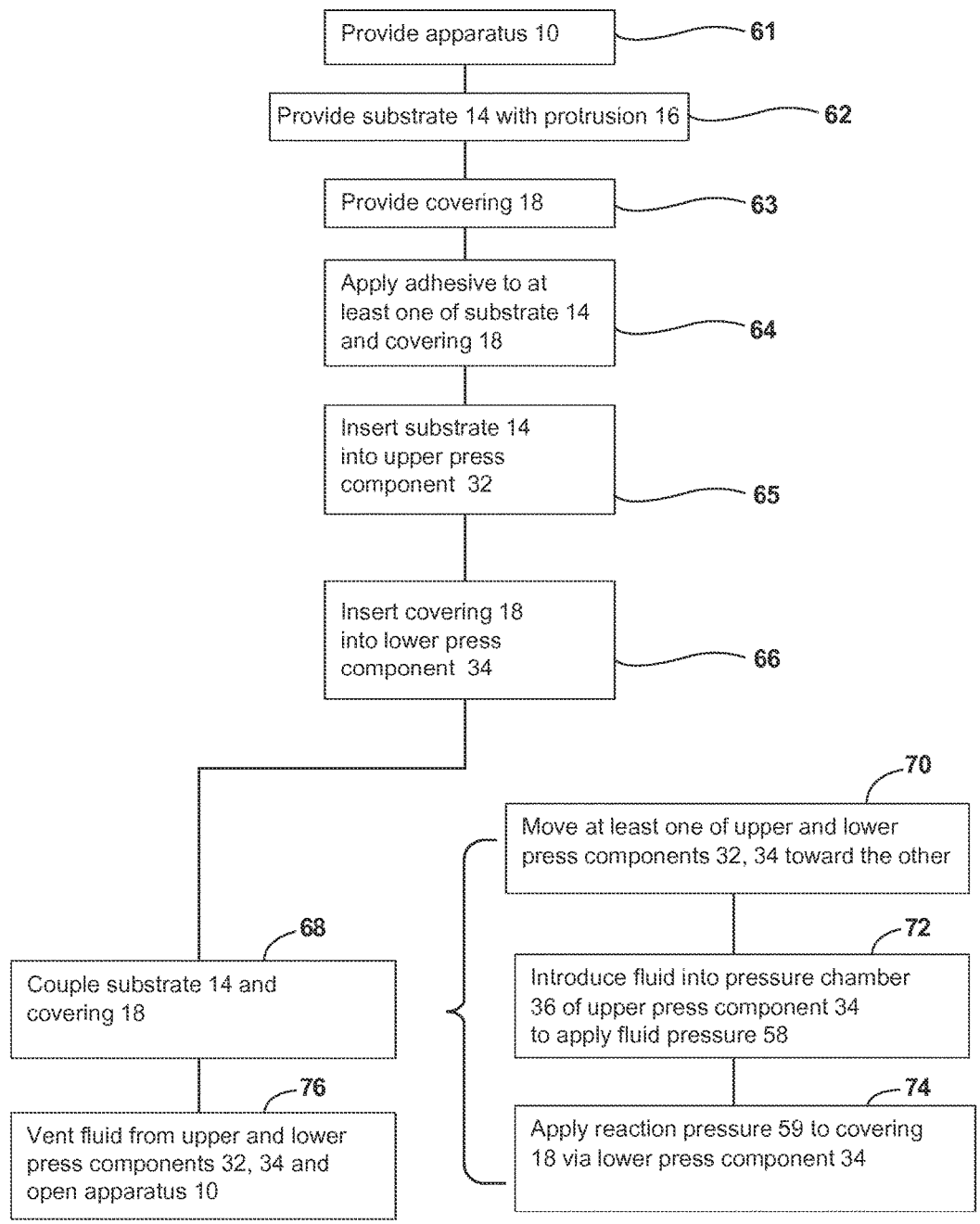
FIG. 6 is a flowchart showing, in an embodiment, a method for manufacturing an automotive interior component.

FIG. 6 is a flowchart showing, in an embodiment, a method for manufacturing automotive interior component 12 in accordance with another embodiment of the present teachings. The method may begin with the process 61 of providing apparatus 10. As set forth hereinabove, apparatus 10 may include upper press component 32 and lower press component 34, and upper press component 32 may include contoured surface 37, gasket 38, and pressure chamber 36.

The method may continue with the process 62 of providing substrate 14 of component 12. As set forth hereinabove, substrate 14 may include front surface 20, back surface 22 and protrusion 16.

The method may continue with the process 63 of providing covering 18 having front surface 28 and back surface 30.

The method may continue with the process 64 of applying an adhesive or bonding agent to at least one of front surface 20 of substrate 14 and/or back surface 30 of covering 18. The adhesive may be a solvent- or water-based, pressure- or heat-activated glue. In one embodiment, the adhesive may be an adhesive commercially sold by Sunstar Incorporated under the trademark Penguin™. In other embodiments, substrate 14 and covering 18 may be bonded together without use of an adhesive or bonding agent. For example, foam layer 24 of covering 18 may be melted (and then cured) to stick or adhere to substrate 14.

The method may continue with the process 65 of inserting substrate 14 into upper press component 32 such that protrusion 16 is in alignment with pressure chamber 36 of upper press component 32.

The method may continue with the process 66 of inserting covering 18 into lower press component 34 such that front surface 28 of covering 18 is in alignment with surfaces 48, 50 of lower press component 34 and back surface 30 of covering is in alignment to contact front surface 20 of substrate 14 (as shown in FIG. 1). In one embodiment, covering 18 can be placed in position on top of surfaces 48, 50 of lower press component 34. Although in the illustrated embodiment, substrate 14 is inserted into upper press component 32 and covering is inserted into lower press component 34, one of ordinary skill in the art will understand that such arrangement may be reversed.

The method may continue with the process 68 of coupling substrate 14 and covering 18. Process 68 may include several subprocesses. Process 68 may begin with the subprocess 70 of moving at least one of upper press component 32 and lower press component 34 toward the other of upper press component 32 and lower press component 34 such that substrate 14 and covering 18 are at least partially surrounded by upper and lower press components 32, 34. Such movement brings substrate 14 within sealing range of gasket 38 to seal pressure chamber 36 of upper press component 32. Subprocess 70 may comprise applying surface pressure 57 to back surface 22 of substrate 14 exterior to gasket 38 and applying reaction pressure 60 to front surface 28 of covering 18 exterior to gasket 38 such that substrate 14 and covering 18 are pressed between pressing surfaces 44, 50 of upper and lower press components 32, 34, respectively.

Process 68 may continue with the subprocess 72 of introducing fluid into pressure chamber 36 of upper press component 32 such that the fluid applies fluid pressure 58 to back surface 22 of substrate 14 internal of gasket 38 (i.e., to back surface 22 disposed over pressure chamber 36). As described herein above, such fluid can be introduced by fluid supply source 35.

Process 68 may continue with the subprocess 74 of applying reaction pressure 59 to front surface 28 of covering 18 disposed over chamber 36 of upper press component 32 via lower press component 34. In one embodiment, reaction surface 48 contacts front surface 28 of covering 18 to apply reaction pressure 59. As set forth hereinabove, at least a portion of reaction pressure 59 can be applied via fluid flowing from source 52 through passageways 51 to front surface 28 of covering 18.

The method may continue with the process 76 of venting fluid from upper press component 32 and lower press component 34 and opening apparatus 10 by moving upper and lower press components 32, 34 away from each other. Such venting (prior to opening) prevents damage to gasket 38.

Figure 7:
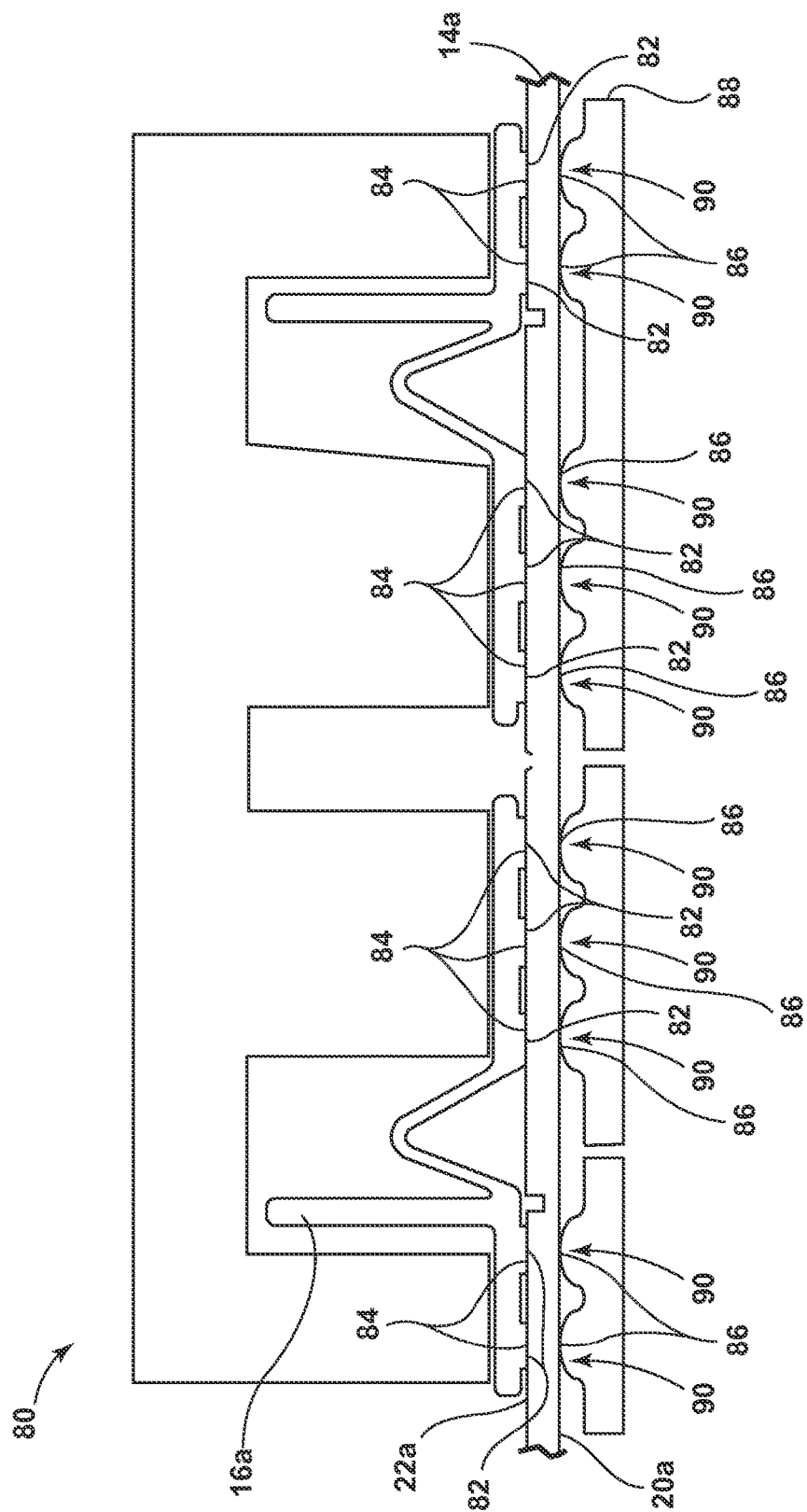
FIG. 7 is a schematic cross-sectional view of a welding apparatus for use in connection with vibration welding a protrusion to a substrate of an automotive interior component in accordance with an embodiment of the present teachings.

FIG. 7 is a schematic cross-sectional view of a welding apparatus 80 for use in connection with vibration welding a protrusion 16a to a substrate 14a in accordance with an embodiment of the present teachings. Such a welding apparatus 80 may be used in the process 62 of providing substrate 14 with protrusion 16, as discussed hereinabove. As discussed in more detail in the '479 application, vibration welding generally involves the physical movement of protrusion 16a having weld bars 82 relative to substrate 14a, with weld bars 82 being moved back and forth horizontally relative to substrate 14a under pressure. This physical movement creates heat which melts affected areas 84 of back surface 22a of substrate 14a, and thus allows weld bars 82 to be welded to substrate 14a upon cooling of areas 84 when the relative movement is stopped. Upon cooling, the thermal shrinkage in areas 84 causes compression in areas 84 and tension in the opposite visible areas 86 of substrate 14.

Still referring to FIG. 7, welding apparatus 80 includes a modified weld fixture 88 (illustrated as a lower weld fixture in FIG. 7) including a plurality of spaced convex pre-stressors 90 (for simplicity, only some of the pre-stressors 90 are numbered/identified in FIG. 7). In the embodiment illustrated, each pre-stressor 90 may be a smooth convex curved shape; however, protrusions of various configurations may be used to transfer the desired force to the substrate 14a. Each pre-stressor 90 may be disposed adjacent front surface 20a of substrate 14a and is further disposed opposite weld bars 82. Each pre-stressor 90 may include a predetermined height to bend substrate 14a such that the tension induced stretch on the back surface 22a matches the expected weld shrink to thus eliminate distortion in the area of weld bars 82.

Figure 8:
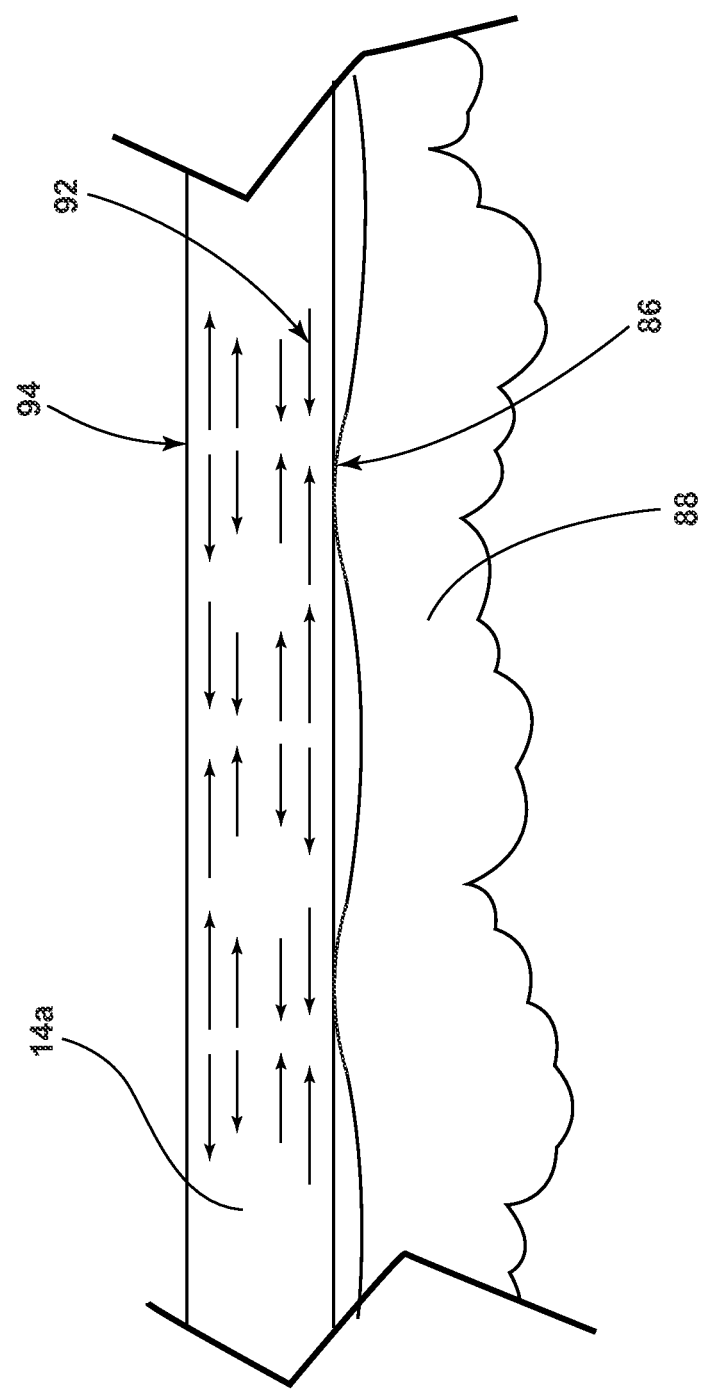
FIG. 8 is a schematic, cross-sectional, enlarged view of the welding apparatus of FIG. 7.

As shown in FIG. 8, modified weld fixture 88 may further include a plurality of holes (not shown) for creating compression in areas 92 and tension in areas 94 of substrate 14a upon the application of a vacuum to draw substrate 14a toward fixture 88. A vacuum seal (not shown) may be provided around substrate 14a for creating a vacuum as discussed above. Although a vacuum force is described herein, those skilled in the art would appreciate the application of similar forces to the modified weld fixture 88 and substrate 14a. Namely, instead of using vacuum to draw substrate 14a toward weld fixture 88, weld fixture 88 (and another upper weld fixture (not shown) for holding the protrusion 16a, i.e., air bag chute) may be simply pressed against substrate 14a (and protrusion 16a) to thus create the aforementioned compressed/tensioned areas.

The method of vibration welding protrusion 16a to substrate 14a will now be described in detail with reference to FIG. 7. Substrate 14a may be disposed relative to modified weld fixture 88, with front surface 20a of substrate 14a, being disposed in contact with pre-stressors 90 of weld fixture 88. The substrate 14a may be laterally aligned relative to weld fixture 88 such that each pre-stressor 90 is disposed opposite the weld bars 82. A vacuum may then be created to draw substrate 14a towards weld fixture 88 via the holes (not shown) in weld fixture 88. In an exemplary embodiment, the vacuum may be generated at 13 psi, with the substrate 14a being maintained at room temperature. Further, in an exemplary embodiment, weld fixture 88 (and the weld fixture for protrusion 16a) may be machined aluminum and include a thin urethane layer to prevent scratching or damage to the grain of substrate 14a.

After vacuum application, substrate 14a may include compression in areas 92 and tension in areas 94 to thus create an uneven front surface 20a prior to vibration welding of protrusion 16a (see FIG. 8 for areas 92, 94). With weld fixture 88 held in place relative to substrate 14a, protrusion 16a including weld bars 82 (and another upper weld fixture (not shown) for holding the protrusion 16a) may be vibration welded to substrate 14a. With reference to FIG. 8, upon cooling of weld areas 94, the initial stretch due to tension in areas 94 is matched by the thermal shrinkage created by cooling of weld areas 94 to thus create a horizontal (or otherwise predetermined contoured) front surface 20a without distortion.

The foregoing numerous embodiments solve one or more problems known in the art. The apparatus for manufacturing an automotive interior component and a method for manufacture thereof in accordance with the present teachings are advantageous since they allow for press bonding of materials with complex geometries on their respective surfaces. Particularly, the present teachings allow for the covering to be installed after the chute has been installed on the substrate. Furthermore, press bonding using a fluid(s) rather than pressing surfaces allows for more precise pressing and may prevent any damage or plastic deformation to the materials being pressed, while minimizing the risk of a bonding failure which could cause dangerous fragments during a deployment of the inflatable restraint.

Although only certain embodiments have been described above with a certain degree of particularity, those skilled in the art could make numerous alterations to the disclosed embodiments without departing from the scope of this disclosure. All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments. Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. It is intended that all matter contained in the above description or shown in the accompanying drawings shall be interpreted as illustrative only and not limiting. Changes in detail or structure may be made without departing from the invention as defined in the appended claims.

Any patent, publication, or other disclosure material, in whole or in part, that is said to be incorporated by reference herein is incorporated herein only to the extent that the incorporated materials do not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

While one or more particular embodiments have been shown and described, it will be understood by those of skill in the art that various changes and modifications can be made without departing from the spirit and scope of the present teachings.

What is claimed is:

1. A method for manufacturing an automotive interior component, comprising:
    providing a first layer of the automotive interior component, the first layer including a substrate and an inflatable restraint chute, wherein the substrate includes a first surface and a second surface opposed of the first surface, wherein the inflatable restraint chute comprises a protrusion protruding from the second surface in a direction away from the first surface, and wherein the protrusion defines an undercut area with respect to the second surface of said substrate;
    providing a second layer of the automotive interior component, the second layer comprising a foam layer and an outer layer, wherein the outer layer includes a first surface and the foam layer includes a second surface opposed of the first surface configured to contact the first surface of the substrate;
    providing an apparatus comprising a first press component and a second press component, wherein the first press component comprises a pressure chamber configured to receive the protrusion;
    inserting the first layer into the first press component such that the protrusion of the inflatable restraint chute is received by the pressure chamber of the first press component and precludes physical contact between a bottom surface of the first press component and the second surface of said substrate, wherein before inserting the first layer into the first press component the inflatable restraint chute is installed on the substrate;
    inserting the second layer into the second press component;
    coupling the first layer and the second layer of the automotive interior component, wherein coupling comprises:
        moving at least one of the first press component and second press component toward the other of the first press component and second press component such that the first surface of the substrate and the second surface of the foam layer are pressed together; and,
        introducing a first fluid into the pressure chamber of the first press component such that the fluid applies a fluid pressure to the second surface of the substrate so as to pressure bond the covering to the substrate.

2. The method of claim 1, wherein the coupling step further comprises applying a pressure-activated adhesive to at least one of the first surface of the substrate and second surface of the foam layer.

3. The method of claim 1, wherein the pressure chamber of the first press component is defined by a gasket configured to contain the first fluid within the pressure chamber.

4. The method of claim 1, wherein coupling the first layer and the second layer of the automotive interior component further comprises applying a first reaction pressure to a portion of the first surface of the outer layer disposed over the pressure chamber of the first press component.

5. The method of claim 4, wherein at least a portion of the first reaction pressure is applied at least in part by a second fluid contacting the first surface of the outer layer.

6. The method of claim 5, wherein the portion of the first reaction pressure applied by the second fluid is less than the fluid pressure.

7. The method of claim 4, wherein the first reaction pressure is applied by a reaction surface of the second press component.

8. The method of claim 4, wherein moving at least one of the first press component and second press component toward the other of the first press component and second press component comprises:
    applying a surface pressure to a portion of the second surface of the substrate disposed externally of the pressure chamber; and,
    applying a second reaction pressure to a portion of the first surface of the outer layer disposed externally of the pressure chamber of the first press component,
    wherein the surface pressure is applied by a pressing surface of the first press component disposed externally of the pressure chamber and the second reaction pressure is applied by a pressing surface of the lower press component.

9. The method of claim 1, wherein the step of providing the first layer further comprises:
    providing a weld fixture including at least one pre-stressor protrusion;
    placing the at least one pre-stressor protrusion against the first layer;
    generating a force to press the weld fixture against the first layer to create compression in the first surface of the substrate where the weld fixture contacts the first layer and to create tension in the second surface of the substrate; and,
    vibration welding the protrusion to the first layer such that a weld bar of the protrusion is welded to the second surface of the substrate.

10. The method of claim 1, wherein the protrusion of the inflatable restraint chute is an air bag chute.

* * * * *